US010709054B2

(12) United States Patent
Hubner et al.

(10) Patent No.: US 10,709,054 B2
(45) Date of Patent: Jul. 14, 2020

(54) PRESSURE SUPPLY SYSTEM FOR COMMODITY METER OF WORK VEHICLE

(71) Applicant: Deere & Company, Moline, IL (US)

(72) Inventors: Cary S. Hubner, Geneseo, IL (US); Joseph W. Migliorini, Granville, IL (US); Nathan A. Mariman, Geneseo, IL (US); Dnyanesh Dhobale, Pune (IN)

(73) Assignee: DEERE & COMPANY, Moline, IL (US)

( * ) Notice: Subject to any disclaimer, the term of this patent is extended or adjusted under 35 U.S.C. 154(b) by 238 days.

(21) Appl. No.: 15/874,171

(22) Filed: Jan. 18, 2018

(65) Prior Publication Data

US 2019/0216007 A1   Jul. 18, 2019

(51) Int. Cl.
| | |
|---|---|
| A01C 7/04 | (2006.01) |
| A01C 7/12 | (2006.01) |
| A01C 7/08 | (2006.01) |
| A01C 7/10 | (2006.01) |

(52) U.S. Cl.
CPC ............. *A01C 7/046* (2013.01); *A01C 7/082* (2013.01); *A01C 7/123* (2013.01); *A01C 7/102* (2013.01); *A01C 7/105* (2013.01)

(58) Field of Classification Search
CPC ......... A01C 7/046; A01C 7/044; A01C 7/042; A01C 7/04; A01C 7/00; A01C 7/082; A01C 7/081; A01C 7/08; A01C 7/123; A01C 7/12; A01C 7/102; A01C 7/10; A01C 7/105

See application file for complete search history.

(56) References Cited

U.S. PATENT DOCUMENTS

| | | |
|---|---|---|
| 6,718,891 B1 | 4/2004 | Burbage, Jr. et al. |
| 7,478,603 B2 | 1/2009 | Riewerts et al. |
| 7,971,420 B1 | 7/2011 | Bollin |

(Continued)

FOREIGN PATENT DOCUMENTS

| | | | |
|---|---|---|---|
| BR | 10205033036 A2 * | 7/2017 | ............. A01C 7/046 |
| WO | 2017112989 A1 | 7/2017 | |

OTHER PUBLICATIONS

Bernard Tobin, Planter Modification Can Fix Neonic Problem, says University of Guelph Researcher, Real Agriculture, Jul. 4, 2016.
(Continued)

*Primary Examiner* — Christopher J. Novosad
(74) *Attorney, Agent, or Firm* — Klintworth & Rozenblat IP LLP

(57) ABSTRACT

A work vehicle includes a frame structure and a plurality of row units with a row unit support structure attached to the frame structure. The row units also include a meter housing with a housing member and a removable cover. The housing member is attached to the row unit support structure and houses a metering element. The metering element is configured to singulate a commodity and meter the commodity from the meter housing. The row unit further includes an air pressure device configured to generate an air pressure differential across the metering element to retain the commodity on the metering element. The air pressure device is fixed relative to the row unit support structure. The air pressure device is configured to remain fixed relative to the row unit support structure as the cover is removed and reattached.

20 Claims, 5 Drawing Sheets

(56) References Cited

U.S. PATENT DOCUMENTS

| | | | |
|---|---|---|---|
| 8,001,914 B2* | 8/2011 | Peterson | A01C 7/102 111/175 |
| 9,426,940 B2 | 8/2016 | Connors et al. | |
| 9,554,503 B2 | 1/2017 | Noer et al. | |
| 9,763,380 B2 | 9/2017 | Hahn et al. | |
| 2010/0282141 A1 | 11/2010 | Wollenhaupt et al. | |
| 2015/0189826 A1 | 7/2015 | Wilhelmi et al. | |
| 2015/0282422 A1 | 10/2015 | Hahn et al. | |
| 2016/0100519 A1* | 4/2016 | Noer | A01C 7/081 111/170 |
| 2016/0135362 A1* | 5/2016 | Connors | A01C 7/102 701/50 |
| 2016/0242352 A1 | 8/2016 | Hussherr et al. | |

OTHER PUBLICATIONS

Monosem Inc., Bee Colony Health and Insecticide Dust Reduction, Jan. 16, 2014.

Dan Charles, 2 Scientists, 2 Different Approaches to Saving Bees From Poison Dust, The Salt: NPR, May 27, 2017.

ISO 17962:2015, Agricultural Machinery—Equipment for Sowing—Minimization of the Environmental Effect of Fan Exhaust From Pneumatic Systems, Jul. 2015.

Bayer Crop Science, Stewardship at Bayer SeedGrowth: SweepAir—tackling dust more efficiently, YouTube.com, Sep. 24, 2015.

Monosem Inc., Seed Planter Photo, undated admitted prior art.

Unknown Manufacturer, Seed Planter Photo, undated admitted prior art.

Great Plains Manufacturing Inc, Great Plains Planters Comply With Pollinator Protection, Bee Friendly Yield-Pro Planters, http:www.greatplainsag.com/en/news/9213/great-plains-planters-comply-pollinator-protection, Apr. 16, 2014.

Extended European Search Report for application No. 19152325 dated Jun. 13, 2019.

* cited by examiner

PRESSURE SUPPLY SYSTEM FOR COMMODITY METER OF WORK VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles, such as planters and seeders, and, more particularly, relates to a pressure supply system for a commodity meter of a work vehicle.

BACKGROUND OF THE DISCLOSURE

Some work vehicles are configured for applying seed, fertilizer, and/or other particulate commodities to a field. Oftentimes, the work vehicle may include a metering system, which meters out a predetermined amount of the commodity for delivery to the soil. The work vehicle may also include a plurality of row units with ground engaging implements that are configured to plant the commodity within the soil.

More specifically, as the work vehicle moves across the field, the ground engaging implement(s) of a row unit may create a furrow in the soil. The metering system may meter out the commodity for delivery toward the furrow. Then, the ground engaging implement(s) may move the soil over the commodity and bury the commodity under the surface of the soil.

SUMMARY OF THE DISCLOSURE

This disclosure provides a work vehicle with an improved pressure supply system for a commodity meter and improved methods for controlling the same.

In one aspect, the disclosure provides a work vehicle that includes a frame structure and a plurality of row units. The row units each include a row unit support structure attached to the frame structure. The row units also include a meter housing with a housing member and a cover. The housing member is attached to the row unit support structure. The cover has an attached position in which the cover is removably attached to the housing member to define an interior of the meter housing. The cover has a detached position in which the cover is at least partly detached from the housing member to provide access to the interior. Moreover, the row units include a metering element that is housed within the interior of the meter housing. The metering element is configured to singulate a commodity and meter the commodity from the meter housing. The row unit further includes an air pressure device configured to generate an air pressure differential across the metering element to retain the commodity on the metering element. The air pressure device is fixed relative to the row unit support structure. The air pressure device is configured to remain fixed relative to the row unit support structure as the cover moves between the attached position and the detached position.

In another aspect, a work vehicle is disclosed that includes a frame structure and a plurality of row units. The row units each include a row unit support structure attached to the frame structure and a meter housing that is supported by the row unit support structure. The meter housing has an interior and a removable member that is selectively removable to provide access to the interior. The row unit further includes a metering element that is housed within the interior of the meter housing. The metering element is supported for movement within the meter housing and configured meter out the commodity from the meter housing. Furthermore, the row units include an air pressure device configured to generate an air pressure differential across the metering element to retain the commodity on the metering element. The air pressure device is supported on the row unit in a location that is spaced apart from the removable member. The air pressure device is configured to remain fixed relative to the row unit support structure during removal of the removable member from another portion of the meter housing.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
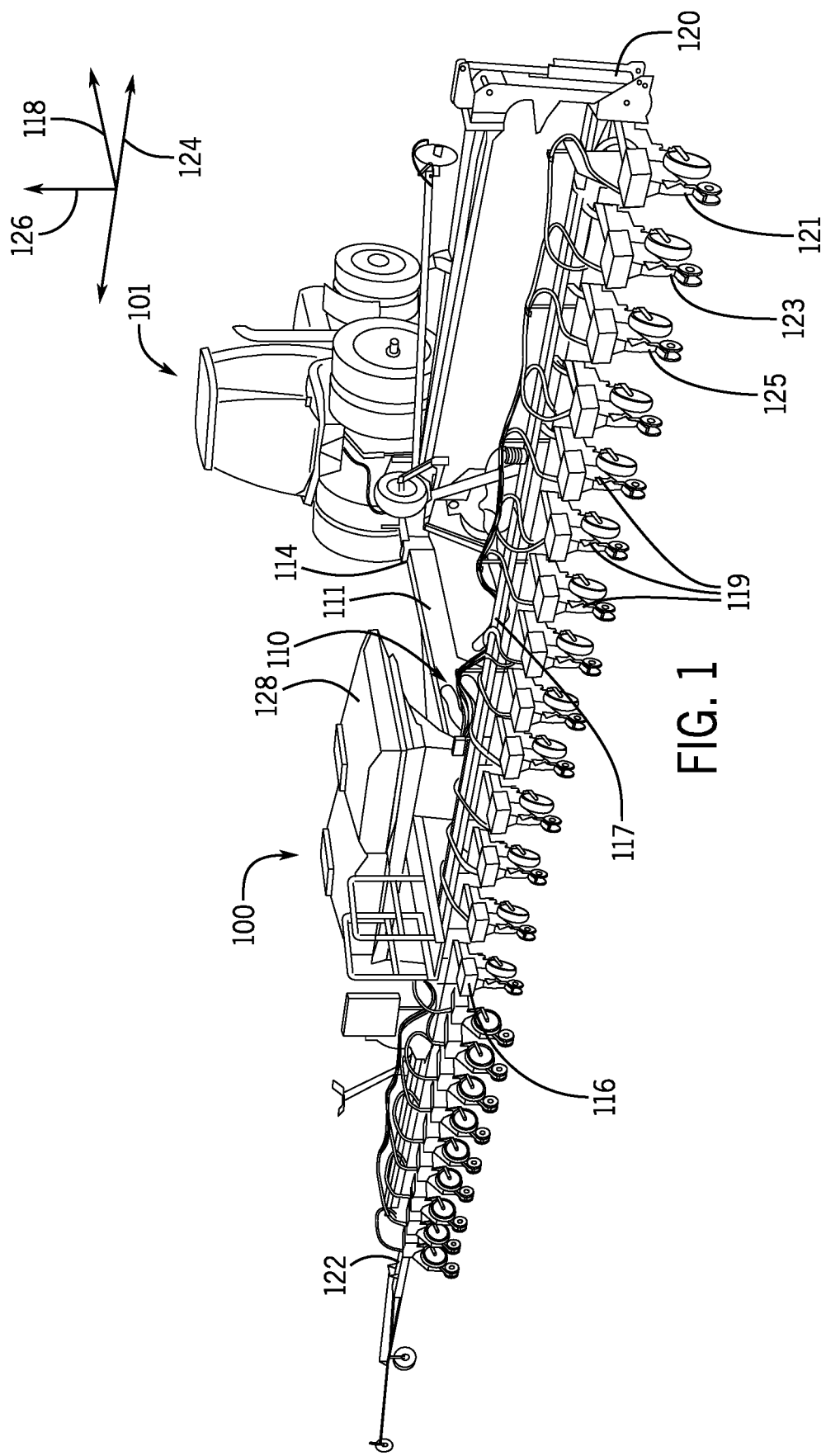
FIG. 1 is a rear perspective view of a towing work vehicle and a towed work vehicle with a plurality of row units according to example embodiments of the present disclosure.

The following describes one or more example embodiments of a pressure supply system for a commodity meter of a seeding and/or planting machine, and the methods for operating the same, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "rear," "front," "back," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

The following describes one or more example implementations of the disclosed work vehicle, as shown in the accompanying figures of the drawings described briefly above. Generally, the disclosed work vehicle includes a frame structure and a plurality of row units that are attached to the frame structure. The row units may include respective ground-engaging implements that move the soil, create a furrow, and/or close a furrow as the work vehicle moves across a field. The row units may also include a respective metering system. The metering system may include a metering element, such as a metering disc, that is configured to meter out a predetermined amount of commodity for delivery to the soil from the respective row unit. The metering system may also include a housing that houses the metering element. The housing may include a removable member, such as a cover, a door, a replaceable panel, or other piece, that may be removably attached to another member of the housing. The removable member may be detached, for example, to provide access to the metering element inside the housing.

Furthermore, the row units of the work vehicle may include a respective air pressure device, such as a fan, that generates positive or negative pressure for operation of the metering system. More specifically, the air pressure device may generate an air pressure differential for retaining individual particles of the commodity (e.g., individual seeds) against the moving metering element, allowing individual particles of the commodity to be singulated from the bulk supply. Accordingly, the singulated particles may be dispensed and delivered to the soil at a controlled rate as the work vehicle moves across the field.

The air pressure devices may be relatively small, compact, and low-capacity because they are configured for individual row units. Overall, the noise produced during operation of the work vehicle may be reduced. This may also reduce manufacturing costs. Likewise, the work vehicle may include less hosing, ducting, etc., resulting in saved space and fewer parts for the work vehicle.

Furthermore, the air pressure device may be mounted on the respective row unit in an advantageous location. For example, the air pressure device may be mounted in a location that is spaced apart from the cover of the metering housing. In some embodiments, for example, the air pressure device may be attached to the support structure of the row unit and spaced apart at a distance from the meter housing. Accordingly, the cover of the meter housing may be removed without having to manually detach connectors of the air pressure device, electrical wiring, exhaust structures, or other components. In other words, the air pressure device may remain fixed relative to the row unit support structure as the cover of the meter housing is detached from and reattached to the meter housing.

Moreover, in some embodiments, the air pressure supply system may include ducting that fluidly connects the interior of the housing to the air pressure device. The ducting may include a quick-connect or auto-connect joint that fluidly disconnects when the housing cover is removed. Additionally, when the cover is reattached to the housing member, the quick-connect/auto-connect joint may fluidly reconnect the air pressure device and the interior of the meter housing automatically.

FIG. 1 illustrates a work vehicle 100 according to example embodiments of the present disclosure. The work vehicle 100 may be towed by another vehicle, such as a tractor 101. Thus, the work vehicle 100 may be a towed work vehicle. In other embodiments, the work vehicle 100 of the present disclosure may be a self-propelled vehicle. In some embodiments, the work vehicle 100 may be a planter or seeder configured for agricultural work. It will be appreciated that the illustrated work vehicle 100 is an example embodiment. One or more features of the present disclosure may be included on a different work vehicle without departing from the scope of the present disclosure.

The work vehicle 100 includes a front end 114 and a rear end 116. The work vehicle 100 also includes a first side 120 and a second side 122. A fore-aft axis 118, extending between the rear end 116 and the front end 114, is indicated in FIG. 1 for reference purposes. It will be appreciated that a travelling direction of the work vehicle 100 extends along the axis 118 from the rear end 116 toward the front end 114. A lateral axis 124 is also indicated in FIG. 1, and it will be appreciated that a lateral direction of the work vehicle 100 (extending between the first side 120 and the second side 122) is parallel to the lateral axis 124. Furthermore, a vertical axis 126 is indicated in FIG. 1 for reference purposes.

Generally, the work vehicle 100 may include a frame structure 110 (i.e., a chassis). The frame structure 110 may include an elongate tongue 111. The tongue 111 may be a rigid or telescoping beam that extends along the fore-aft axis 118. The tongue 111 may include a towing package for hitching and unhitching from the tractor 101. The frame structure 110 may further include a lateral beam 117. The lateral beam 117 may be a rigid member that extends along the lateral axis 124. The lateral beam 117 may be fixed to the tongue 111 of the frame structure, proximate the rear end 116 of the work vehicle 100.

The work vehicle 100 may further include a plurality of row units 119. The row units 119 may be attached to the lateral beam 117 of the frame structure 110. The row units 119 may branch from and extend rearward from the lateral beam 117 to define much of the rear end 116 of the work vehicle 100. The plurality of row units 119 may be substantially similar to each other and may include a first row unit 121, a second row unit 123, a third row unit 125, and so on, across the rear end 116 along the lateral axis 124.

The row units 119 may include a number of features that provide various advantages. These features will be discussed with reference to FIG. 2, which illustrates the first row unit 121. The first row unit 121 may be a representative example of the second row unit 123, the third row unit 125 and/or another of the plurality of row units 119.

As shown, the first row unit 121 may include a support structure 129. The support structure 129 may include a plurality of strong, frame-like pieces, brackets, linkages, etc. The support structure 129 may be attached to the frame structure 110. For example, the support structure 129 may be moveably attached to the lateral beam 117 via a linkage 127, which allows movement of the support structure 129 along the vertical axis 126 relative to the frame structure 110. The support structure 129 may also include a forward member 122 and a rear member 115. The forward member 122 may be disposed between the linkage 127 and the rear member 115 with respect to the fore-aft axis 118. In some embodiments, the rear member 115 may be pivotally attached to the forward member 122 for rotation about an axis that is parallel to the lateral axis 124.

The first row unit 121 may also include a ground system 112. The ground system 112 may include plurality of depth control gauge wheels 147 that are rotationally attached to the forward member 122 to support the support structure 129 above the soil. The ground system 112 may also include ground engaging implements 140. The ground engaging implements 140 may be moveably attached (e.g., rotationally attached) to the support structure 129 and may extend downward therefrom. The ground engaging implements 140 may be configured for moving soil as the work vehicle 100 moves across the field. For example, the ground engaging implements 140 may be configured for opening and/or closing a furrow, trench, or another opening in the soil.

In some embodiments, the ground engaging implements 140 may include a plurality of opening discs 142 and a plurality of closing wheels 144. The opening discs 142 may be arranged side-by-side along the lateral axis 124 between opposing wheels 147. The opening discs 142 may be canted toward each other at an angle relative to the fore-aft axis 118. Accordingly, the opening discs 142 may be configured for opening a furrow in the earth as the work vehicle 100 travels. The closing wheels 144 may be arranged side-by-side along the lateral axis 124 and canted relative to the fore-aft axis 118. The closing wheels 144 may be attached to the rear member 115 of the support structure 129. Accordingly, the closing wheels 144 may be configured for closing the furrow in the earth as the work vehicle 100 travels across the field. As will be discussed, the row unit 121 also includes features configured to deliver commodity into the open furrow before the closing wheels 144 close the furrow.

Moreover, the first row unit 121 may include a commodity system 150. The commodity system 150 may be configured to provide a commodity to the soil as the work vehicle 100 moves across the terrain.

The commodity system 150 may include a reservoir 152. The reservoir 152 may be in communication with a tank 128 (FIG. 1) of the work vehicle 100, which contains seed, fertilizer, and/or another granular commodity. The commodity within the tank 128 may be delivered (e.g., via a hose) to the reservoir 152 of the row unit 121 for distribution to the soil as will be discussed.

The commodity system 150 of the row unit 121 may also include a metering system 130. The metering system 130 may be a singulating metering system in some embodiments. The metering system 130 may operate to meter out the commodity from the reservoir 152 at a controlled rate as the vehicle 100 moves across the field. The metering system 130 may also move the metered commodity to a commodity delivery system 198. The commodity delivery system 198 may be a hollow structure that extends downward toward the ground from the meter housing 146. The open, lower end of the commodity delivery system 198 may be disposed rearward of the opener discs 142 and forward of the closing wheels 144. Accordingly, the delivery system 198 may deliver the particles of commodity into a furrow, which has been opened by the opener discs 142 before the closing wheels 144 close the furrow and bury the deposited commodity in the ground.

Figure 2:
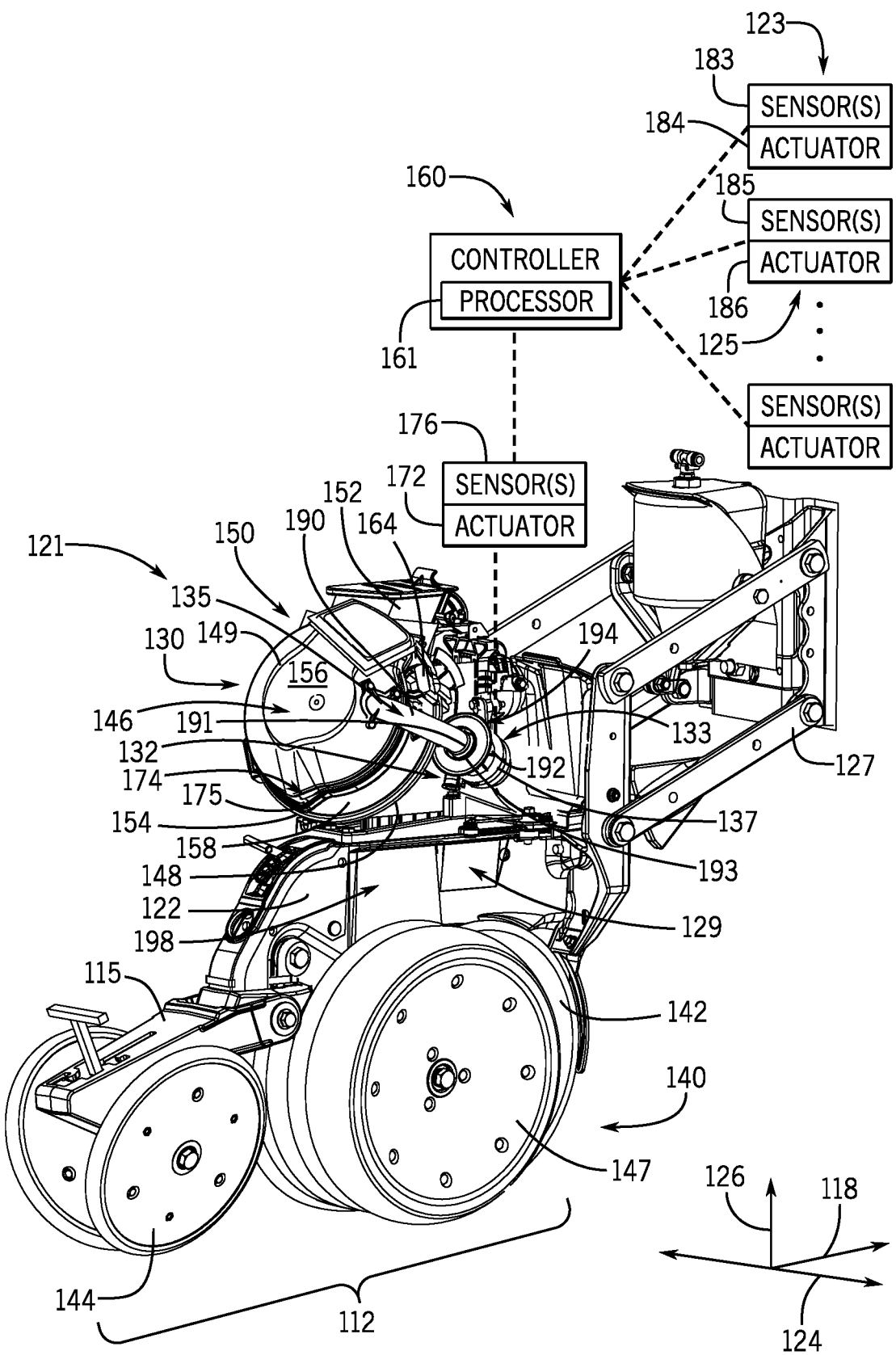
FIG. 2 is a perspective view of a row unit with a metering system according to example embodiments of the present disclosure, wherein a cover of a meter housing is shown in an attached and closed position relative to a housing member of the meter housing.
Figure 3:
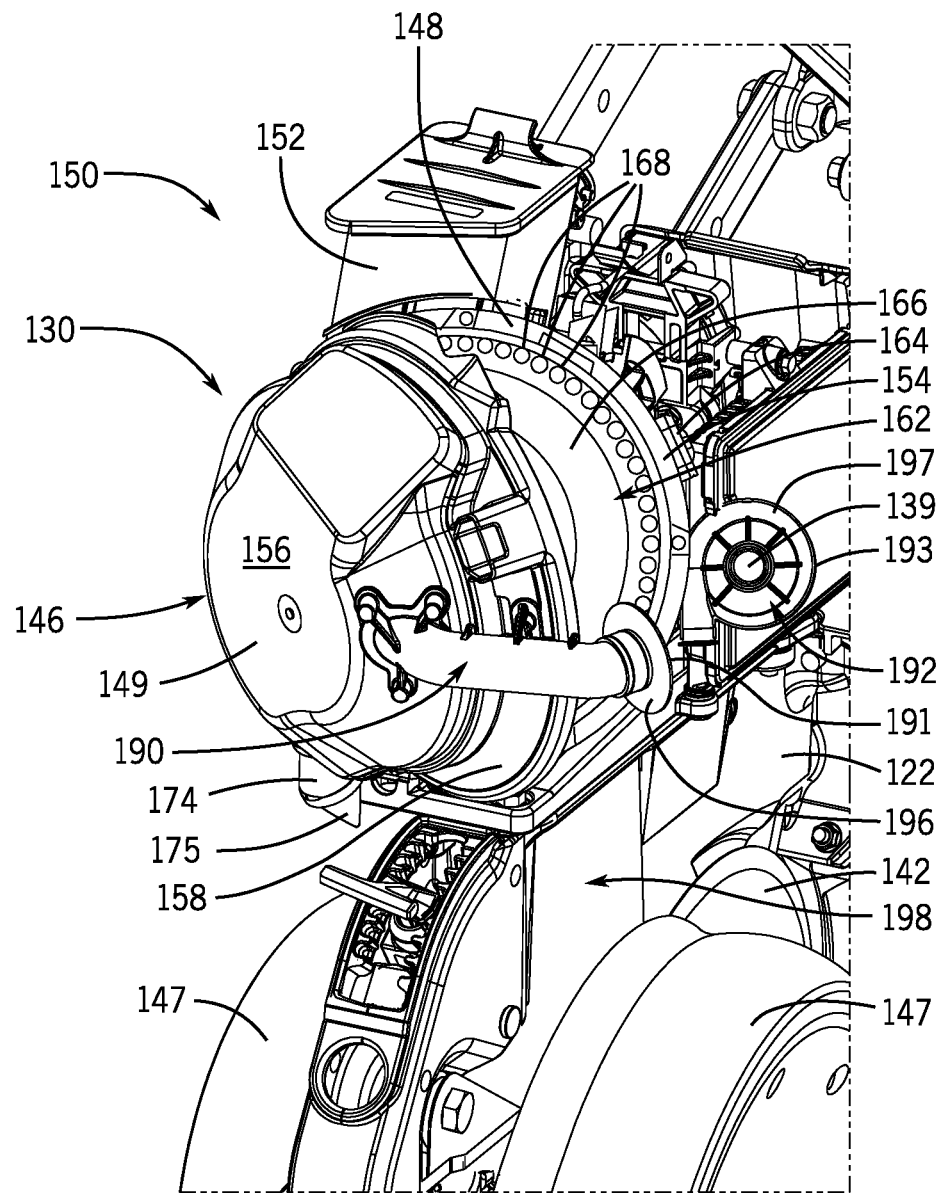
FIG. 3 is a perspective view of the row unit of FIG. 2 with the cover of the meter housing shown partly detached from the housing member and moved to a first open position.
Figure 4:
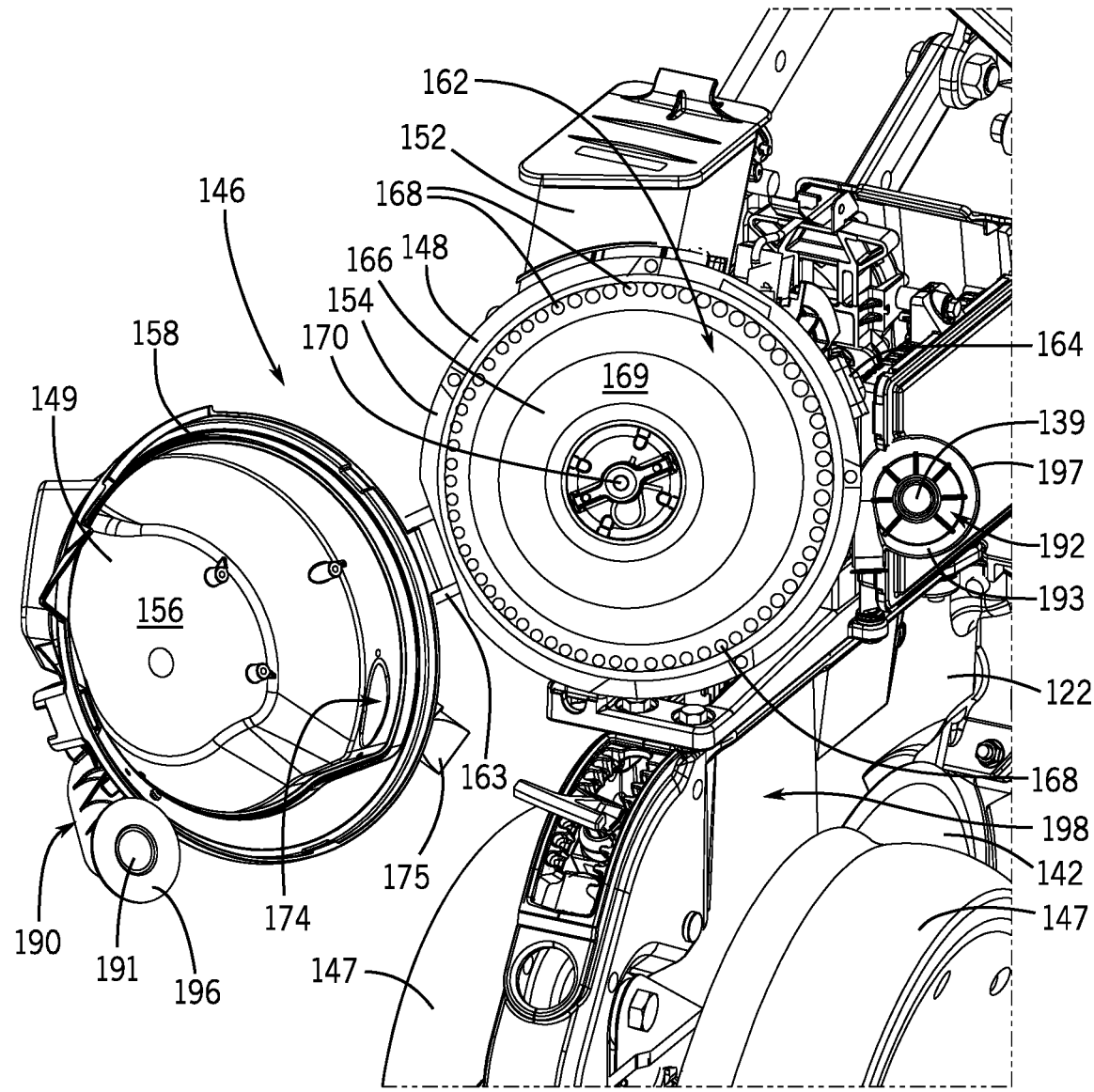
FIG. 4 is a perspective view of the row unit of FIG. 2 with the cover of the meter housing shown partly detached from the housing member and moved to a second open position.

As shown in FIGS. 2-4, the metering system 130 may include a meter housing 146. The meter housing 146 may be in communication with the reservoir 152 and may receive a bulk supply of the commodity therefrom. The meter housing 146 may comprise a housing member 148 and a cover 149. The housing member 148 may be fixed to the forward member 122 of the support structure 129 of the row unit 121. The cover 149 may be removably attached to the housing member 148. For example, FIG. 2 shows the cover 149 attached to the housing member 148. In other words, FIG. 2 shows the cover 149 in a closed position or an attached position with respect to the housing member 148. FIG. 3 shows the cover 149 detached and in a first open position with respect to the housing member 148. FIG. 4 shows the cover 149 detached and in a second open position with respect to the housing member 148.

The housing member 148 may be rounded and may include a peripheral lip 154 that faces rearward from the row unit 121. The cover 149 may be thin-walled, hollow, and three-dimensionally contoured. The cover 149 may include an enlarged cover plate 156 and a side wall 158 that projects from the cover plate 156. When in the attached position (FIG. 2), the side wall 158 of the cover 149 may align with and mate with the peripheral lip 154 of the housing member 148. Accordingly, the cover 149 and the housing member 148 may cooperate to define an interior 162 of the meter housing 146 (FIGS. 3 and 4).

Also, in some embodiments, one side of the cover 149 may be pivotally attached to the housing member 148, for example, by a hinge 163 (FIG. 4). As such, the cover 149 may rotate about the hinge 163 between the attached position (FIG. 2) and the detached positions (FIGS. 3 and 4). Additionally, the cover 149 may be retained in the attached position by at least one latch 164 or by another retaining device. The latch 164 may extend from the peripheral lip 154 of the housing member 148 to releaseably engage the side wall 158 of the cover 149. In additional embodiments of the present disclosure, the hinge 163 may allow the cover 149 to be completely removed and detached from the housing member 148 and then re-attached to the housing member 148. It will also be appreciated that the hinge 163 is optional; therefore, the cover 149 may be removably attached to the housing member 148, for example, via a snap-fit attachment or other type of attachment.

As shown in FIG. 4, the metering system 130 may additionally include a metering element 166. The metering element 166 may be a relatively flat and rounded disc or wheel. The metering element 166 may include a series of holes 168 that are aligned circumferentially about its periphery. The metering element 166 may be disposed within the interior 162 of the meter housing 146. The metering element 166 may be supported for rotation relative to the housing member 148 by a shaft 170 such that a rear side 169 of the metering element 166 faces generally rearward. An opposing front side of the metering element 166 may face the housing member 148 and commodity may be received from the reservoir 152 in the space therebetween. The space may also be open to the commodity delivery system 198. The metering element 166 may rotate about the axis of the shaft 170 relative to the housing member 148 and meter out particles of the commodity into the commodity delivery system 198. It will be appreciated that other orientations of the metering system 130 and metering element 166 are possible within the scope of the present disclosure. For example, in additional embodiments, the metering element 166 may be a flat disc metering element that is oriented fore and aft in a vertical plane.

When the cover 149 is closed and attached to the housing member 148 (FIG. 2), the cover 149 and the housing member 148 may cooperatively enclose the metering element 166 within the interior 162 of the meter housing 146. The rear side 169 of the metering element 166 may face the cover 149, and the opposing side of the metering element 166 may face the housing member 148. When the cover 149 is opened and detached from the housing member 148 (FIGS. 3 and 4), the rear side 169 and periphery of the metering element 166 may be exposed, and the interior 162 of the meter housing 146 may be more accessible. For example, the cover 149 may be opened for repairing, replacing, or otherwise servicing the metering element 166.

Furthermore, the commodity system 150 of the first row unit 121 may include a pressure supply system 132. As shown in the illustrated embodiment, the pressure supply system 132 may be configured for providing negative air pressure (i.e., suction) to the meter housing 146, allowing the metering system 130 to meter out particles of the commodity. However, in other embodiments, the pressure supply system 132 may be configured for providing positive air pressure (i.e., blowing air) to the metering system 130 for the same purposes.

Figure 5:
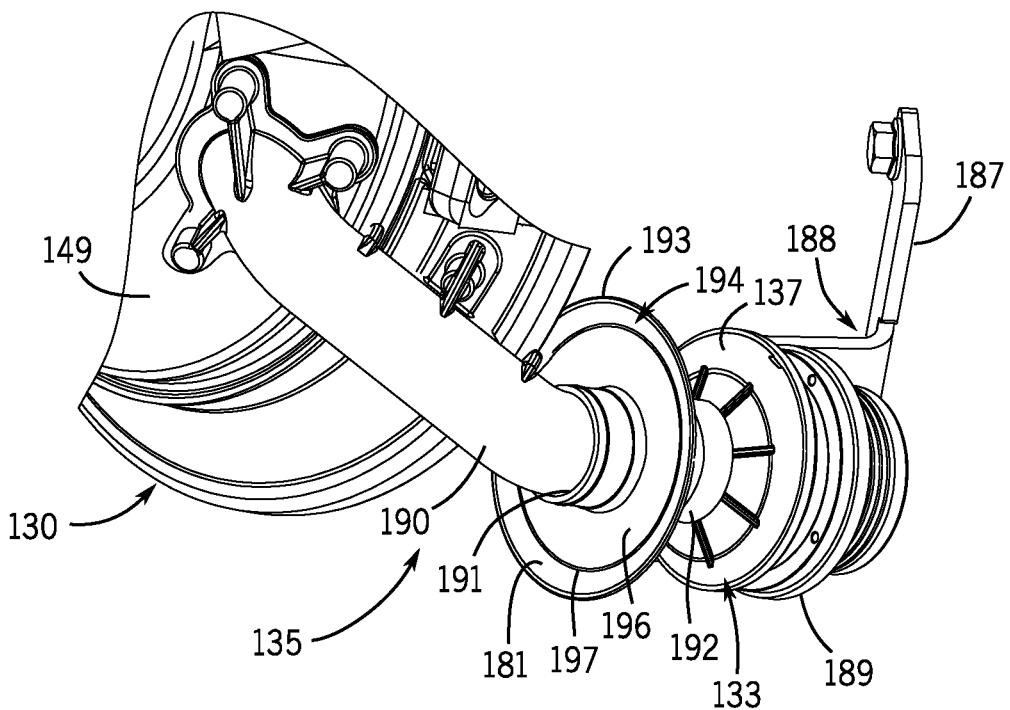
FIG. 5 is a perspective view of a fluid connector of the row unit according to example embodiments.
Figure 6:
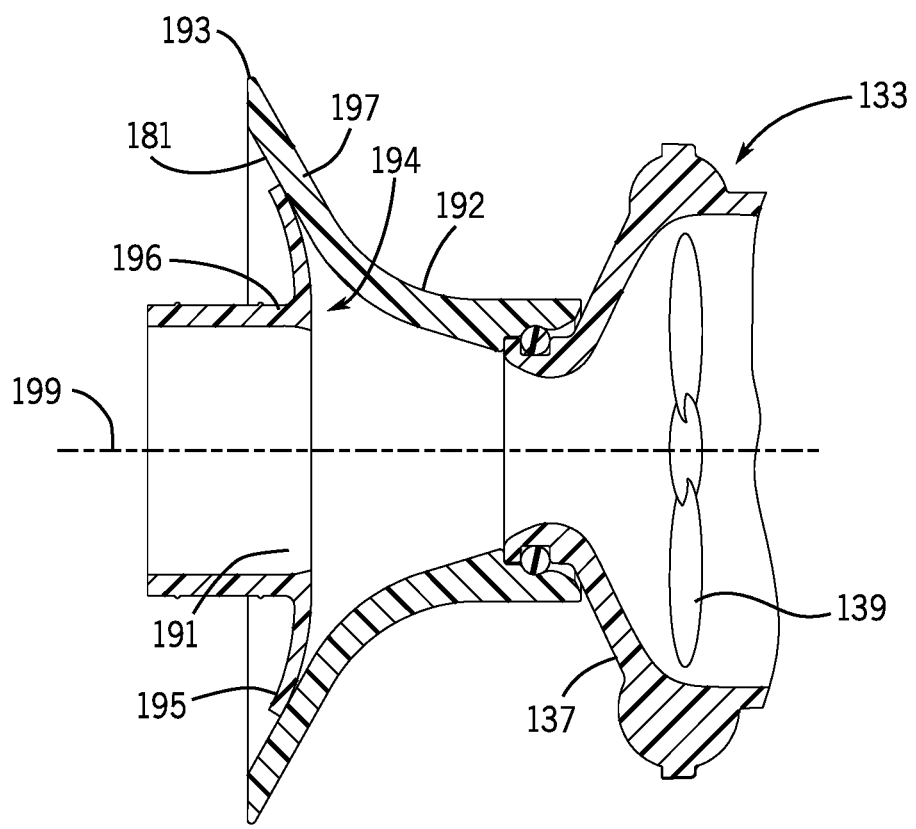
FIG. 6 is a section view of the fluid connector of FIG. 5.

As shown in FIGS. 2, 5, and 6, the pressure supply system 132 may include an air pressure device 133. The air pressure device 133 may include a fan housing 137 and a moveable member, such as a blower or fan 139, that is enclosed within the fan housing 137. As shown in FIG. 2, the fan housing 137 may be fixed to the forward member 122 of the support structure 129 of the row unit 121, or in another location that is spaced apart from the cover 149, such that the pressure supply system 132 does not interfere with removal and attachment of the cover 149 from the housing member 148. As shown in FIG. 5, the fan housing 137 may be attached to the support structure 129 via a bracket 188. The bracket 188 may include a first portion 187 with one or more legs that are fixed to the support structure 129 (e.g., via one or more fasteners). The bracket 188 may also include a second portion 189 that encircles and attaches to the fan housing 137.

The fan housing 137 may be hollow and may have a volute shape in some embodiments. As shown in FIG. 6, the fan 139 may have a plurality of blades and may be rotatably supported within the fan housing 137. The fan 139 may be driven in rotation relative to the fan housing 137 by a fan actuator 172 (FIG. 2). In some embodiments, the fan actuator 172 may be an electric motor that converts electrical power to mechanical energy to rotate the fan 139 within the fan housing 137. The fan actuator 172 may be supported on the forward member 122 of the support structure 129 of the row unit 121. Accordingly, electrical wiring to the fan actuator 172 is unlikely to interfere with removal and attachment of the cover 149 from the housing member 148. Likewise, exhaust structures from the fan housing 137 are unlikely to interfere with movement of the cover 149 (e.g., exhaust structures of the type disclosed in patent application Ser. No. 15/874,214, filed Jan. 18, 2018, entitled "Exhaust System for Air Pressure Supply System of Work Vehicle", the entire disclosure of which is hereby incorporated by reference).

As shown in FIGS. 2-6, the pressure supply system 132 may further include a fluid connector 135 that fluidly connects the air pressure device 133 and the metering system 130. In some embodiments, the fluid connector 135 is a pipe with a passage that fluidly connects the interior 162 of the meter housing 146 and the interior of the fan housing 137.

In some embodiments, the fluid connector 135 may include a first member 190. The first member 190 may be a rigid section of pipe that is fixed on one end to the cover 149 of the meter housing 146 and that terminates at an opposing free end 191. In some embodiments, the first member 190 may be attached to one peripheral side of the cover plate 156, and the first member 190 may extend in a non-linear direction therefrom. For example, the first member 190 may extend laterally from the cover plate 156 and may curve forward when the cover 149 is in the attached position of FIG. 2. In some embodiments, the first member 190 may be fixed to the cover 149 in an area that is substantially opposite the hinge 163. Also, in some embodiments, the first member 190 may be integrally connected to the cover 149 so as to cooperatively define a unitary, one-piece member.

The fluid connector 135 may also include a second member 192. The second member 192 may be a relatively short segment of rigid pipe that is fixed on one end to the fan housing 137, extends generally rearward, and that terminates at an opposing free end 193. An axis 199 of the second member 192 may be generally aligned with the axis of rotation of the fan 139.

The first member 190 and the second member 192 may removably attach at a joint 194. More specifically, as shown in FIG. 2, the end 191 of the first member 190 may attach to the second member 192 to define the joint 194. Also, in some embodiments, the joint 194 may include one or more sealing members for fluidly connecting the first member 190 and the second member 192 and substantially sealing the passage extending through the fluid connector 135. For example, as shown in FIGS. 3-6, the end 191 of the first member 190 may include a first sealing member 196, and the end 193 of the second member 192 may define a second sealing member 197. The first sealing member 196 may include a flexible flange 195 that projects outward radially from the axis 199. The second sealing member 197 may be bell-shaped with an annular and convexly curved inner surface 181. As will be discussed, the first sealing member 196 (the male sealing member) may be received in the second sealing member 197 (the female sealing member). It will be appreciated that the positions of the first and second sealing members 196, 197 may be reversed (with the first sealing member 196 attached to the second member 192 and the second sealing member 197 attached to the first member 190) without departing from the scope of the present disclosure.

When the cover 149 of the meter housing 146 is in the attached and closed position of FIGS. 2, 5, and 6, the flange 195 of the first sealing member 196 may be received within and may substantially seal against the convexly curved surface 181 of the second sealing member 197, thereby defining a substantially continuous fluid passage through the fluid connector 135 from the meter housing 146 to the fan housing 137.

In this position, the rotating fan 139 may provide a suction force (via the fluid connector 135) to the interior 162 of the meter housing 146. More specifically, the fan 139 may suck air through the holes 168 in the metering element 166, causing a pressure differential across the metering element. Individual particles of the commodity from the reservoir 152 may be sucked into the holes 168 and retained there as the metering element 166 rotates about the axis of the shaft 170. The individual particles may be released in succession from the metering element 166 and delivered to the commodity delivery system 198 for delivery to the soil.

As stated above, it may be necessary to open the cover 149 of the meter housing 146, for example, to service the metering element 166, to replace the metering element 166, etc. As the cover 149 moves from the attached position of FIG. 2 and opens toward the detached positions of FIGS. 3 and 4, the first sealing member 196 may automatically unseal and move away from the second sealing member 197. The cover 149 may then be moved back toward the attached position (FIG. 2). As the cover 149 returns to this position, the first member 190 may align with the second member 192, allowing the first sealing member 196 to re-seal against the second sealing member 197. Accordingly, the cover 149 of the meter housing 146 may be quickly and conveniently opened and closed, without having to manipulate the air pressure device 133.

It will be appreciated that the joint 194 may be configured differently without departing from the scope of the present disclosure. For example, the joint 194 could be configured to be manually coupled and de-coupled for opening and closing the cover 149.

The metering system 130 may also include a number of additional features that provide other advantages. For example, the metering system 130 may include a collector structure 174 that is supported by the meter housing 146. In some embodiments, the collector structure 174 may be a hollow projection that extends downward from a lower area of the cover 149. In some embodiments, the collector structure 174 may be disposed on a lower peripheral area of the cover 149, between hinge 163 and the first member 190 of the fluid connector 135. Accordingly, during operation of the commodity system 150, debris or other substances may fall due to gravity into the collector structure 174 before being sucked into the fluid connector 135 and the fan housing 137. Thus, the fan 139 is unlikely to be damaged by such debris. In some embodiments, the collector structure 174 may include a clean-out valve 175 for removing the debris within the collector structure 174. The clean-out valve 175 may be manually opened in some embodiments. In other embodiments, the clean-out valve 175 may be biased closed, for example, due to the suction force provided by the fan 139, and once the suction force is reduced, the clean-out valve 175 may automatically open to release the debris collected in the collector structure 174. In additional embodiments, the clean-out valve 175 may automatically open under the weight of the debris.

In addition, the work vehicle 100 may include a control system 160. The control system 160 may be configured for controlling the metering system 130 and/or the pressure supply system 132. Furthermore, in some embodiments, the control system 160 may communicate with and independently control the metering system 130 and/or pressure supply system 132 of different row units 119 of the work vehicle 100.

The control system 160 is shown in FIG. 2 according to example embodiments. It will be understood that FIG. 2 is a simplified representation of the control system 160 for purposes of explanation and ease of description, and FIG. 2 is not intended to limit the application or scope of the subject matter in any way. Practical embodiments of the control system 160 may vary from the illustrated embodiment without departing from the scope of the present disclosure. Also, the control system 160 may include numerous other devices and components for providing additional functions and features, as will be appreciated in the art.

The control system 160 may be wholly supported on the work vehicle 100, or the control system 160 may include components that are remote from the vehicle 100. The control system 160 may be an electronic (e.g., computerized) control system in some embodiments. In other embodiments, the control system 160 may be a hydraulic control system, a pneumatic control system, a combination control system, etc.

The control system 160 may include a processor 161. The processor 161 may comprise hardware, software, and/or firmware components configured to enable communications and/or interaction between sensor(s) of the row unit 121, actuator(s) of the row unit 121, as well as a memory element, a user interface (U/I), etc. The processor 161 may also perform additional tasks and/or functions described in greater detail below. Depending on the embodiment, the processor 161 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processor 161 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processor 161 includes processing logic that may be configured to carry out the functions, techniques, and processing tasks associated with the operation of the control system 160. Furthermore, the steps of a method or algorithm described in connection with the embodiments disclosed herein may be embodied directly in hardware, in firmware, in a software module executed by the processor 161, or in any practical combination thereof.

The control system 160 may communicate with the fan actuator 172 for controlling the speed of the fan 139. More specifically, the control system 160 may output control signals to the fan actuator 172 for changing the speed (RPM) of the fan 139 and, thus, controlling the amount of suction pressure provided to the metering system 130 by the pressure supply system 132.

Moreover, the control system 160 may communicate with at least one sensor 176. In some embodiments, the sensor 176 may be a pressure sensor configured for detecting an air pressure condition associated with the pressure differential provided by the pressure supply system 132. For example, in some embodiments, the sensor 176 may be mounted to the fluid connector 135, to the fan housing 137, or another fluid line of the pressure supply system 132 for directly detecting a current pressure within those fluid passages. In another embodiment, the sensor 176 may be configured for detecting the speed (RPMs) of the fan 139 for indirectly measuring the pressure provided thereby. The sensor 176 may detect one or more of these conditions and communicate the data to the processor 161. The control system 160 may, in turn, control the speed of the fan 139 based at least partly on the condition (i.e., the pressure condition) detected by the sensor 176.

Also, in some embodiments, the sensor 176 may be a metering sensor configured for detecting a commodity condition associated with the commodity metered out by the metering system 130. For example, in some embodiments, the sensor 176 may be supported by the commodity delivery system 198 and may detect particles of commodity as they move therethrough. In some embodiments, the sensor 176 may be a light sensor that detects the particles as they move through the system 198. The sensor 176 may detect the rate at which particles of the commodity are moving through the system 198, may detect the number of particles moving through the system 198, etc. The sensor 176 may communicate this data to the processor 161. The control system 160 may, in turn, control the speed of the fan 139 based at least partly on the condition (i.e., the commodity condition)

detected by the sensor 176. For example, if the sensor 176 detects that the seed count is too low, indicating a large number of "skips," the control system 160 may increase the speed of the fan 139 to increase pressure at the metering system 130. In contrast, if the sensor 176 detects that the seed count is too high, indicating a large number of "multiples," the control system 160 may decrease the speed of the fan 139 to decrease pressure at the metering system 130.

Thus, the control unit 160 may control the metering system 130 and the pressure supply system 132 of the first row unit 121. Furthermore, the control system 160 may be used to control other row units 119 of the work vehicle 100 as well. The control system 160 may be configured to control the metering system 130/pressure supply system 132 of one row unit 119 independently of the metering system 130/pressure supply system 132 of another row unit 119. In some embodiments, the control system 160 may independently control each of the metering systems 130 and pressure supply systems 132.

As represented in FIG. 2, the control system 160 may be in communication with at least one sensor 183 and actuator 184 of the second row unit 123 of the work vehicle 100. The sensor 183 may correspond to the sensor(s) 176 of the first row unit 121, and the actuator 184 may correspond to the actuator 172 of the first row unit 121. Accordingly, the sensor 183 may detect an air pressure condition and/or a commodity condition of the second row unit 123 and communicate corresponding data to the processor 161. The control system 160 may, in turn, control the actuator 184 according to this input from the sensor 183 for changing the air pressure in the metering system 130 of the second row unit 123. In some situations, the actuator 184 of the second row unit 123 may be controlled independently and differently than the actuator 172 of the first row unit 121.

Likewise, the control system 160 may be in communication with a sensor 185 and an actuator 186 of the third row unit 125. Thus, the air pressure system 132 of the third row unit 125 may be controlled independently as well. It will be appreciated that the control system 160 may communicate with sensors/actuators of the other row units 119 of the work vehicle 100 so that these row units 119 may be independently controlled as well.

As such, the control system 160 may independently control the pressure supply systems 132 and meter systems 130 of the different row units 119. This may be useful, for example, for tailoring the pressure of a particular row unit 119 according to its specific calibration data. Also, in some embodiments, the control system 160 may shut off commodity output from a particular row unit 119 simply by reducing the speed of the respective fan to zero while the fans of other row units 119 continue to operate for metering commodity from those row units 119.

In summary, the work vehicle 100 of the present disclosure includes row units 119 with respective air pressure systems 132 and respective metering systems 130. The systems 132, 130 of the different row units 119 may be controlled differently and independently. The air pressure device 133 (e.g., the fan 139 with fan housing 137) for the row units 119 may be relatively small, compact, and low-capacity because they are configured for the individual row units 119. Overall, the noise produced during operation of the work vehicle 100 may be reduced. This may also reduce manufacturing costs. Likewise, the work vehicle may include less hosing, ducting, etc., resulting in saved space and fewer parts for the work vehicle. Furthermore, the air pressure device 133 may be mounted in a location spaced apart from the cover 149, allowing the meter housing 146 to be opened and shut without having to manipulate the air pressure device 133.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A work vehicle comprising:
a frame structure; and
a plurality of row units that each include:
a row unit support structure attached to the frame structure;
a meter housing with a housing member and a cover, the housing member being attached to the row unit support structure, the cover having an attached position in which the cover is removably attached to the housing member to define an interior of the meter housing, the cover having a detached position in which the cover is at least partly detached from the housing member to provide access to the interior;
a metering element that is housed within the interior of the meter housing, the metering element configured to singulate a commodity and meter the commodity from the meter housing; and
an air pressure device configured to generate an air pressure differential across the metering element to retain the commodity on the metering element, the air pressure device being fixed relative to the row unit support structure, the air pressure device configured to remain fixed relative to the row unit support structure as the cover moves between the attached position and the detached position.

2. The work vehicle of claim 1, wherein the air pressure device includes a fan housing with an interior and a fan that is housed within the interior of the fan housing, the fan housing being fixed relative to the row unit support structure and configured to remain fixed as the cover moves between the attached position and the detached position;
further comprising a fluid connector that extends between the fan housing and the meter housing, the fluid connector including a passage that fluidly connects the interior of the meter housing and the interior of the fan housing, the fluid connector including a first connector member and a second connector member that are removably attached at a joint; wherein the first connector member is attached to the cover; and wherein the second connector member is attached to the fan housing.

3. The work vehicle of claim 2, wherein the first and second connector members are configured to fluidly disconnect at the joint as the cover moves from the attached position to the detached position; and wherein the first and second connector members are configured to fluidly connect at the joint as the cover moves from the detached position to the attached position.

4. The work vehicle of claim 2, wherein the joint includes at least one sealing member configured to fluidly seal the joint.

5. The work vehicle of claim 4, wherein one of the first and second connector members includes an annular convex surface; and wherein the sealing member is configured to seal against the annular convex surface.

6. The work vehicle of claim 1, further comprising a collector structure that is supported by the meter housing, the collector structure configured to collect a substance that falls due to gravity into the collector structure, thereby avoiding travel toward the air pressure device.

7. The work vehicle of claim 1, wherein the air pressure device includes an actuator;

further comprising a pressure sensor configured to detect an air pressure condition associated with the air pressure differential generated by the air pressure device; and further comprising a control system configured to control the actuator based, at east partly, on the air pressure condition detected by the pressure sensor.

8. The work vehicle of claim 1, wherein the air pressure device includes an actuator:

further comprising a metering sensor configured to detect a commodity condition associated with the commodity metered out by the metering element; and further comprising a control system configured to control the actuator based, at least partly, on the commodity condition detected by the metering sensor.

9. The work vehicle of claim 8, wherein the first actuator is a first electric motor and the first movable member is a first fan; and wherein the second actuator is a second electric motor and the second movable member is a second fan.

10. The work vehicle of claim 1, wherein the plurality of row units includes a first row unit and a second row unit;

wherein the first row unit includes a first metering element, a first air pressure device, and a first actuator configured to actuate a first movable member of the first air pressure device;

wherein the second row unit includes a second metering element, a second air pressure device, and a second actuator configured to actuate a second movable member of the second air pressure device; and further comprising a control system configured to control the first actuator independent of the second actuator.

11. A work vehicle comprising:
a frame structure; and
a plurality of row units that each include:
a row unit support structure attached to the frame structure;
a meter housing that is supported by the row unit support structure, the meter housing having an interior and a removable member that is selectively removable to provide access to the interior;

a metering element that is housed within the interior of the meter housing, the metering element supported for movement within the meter housing and configured meter out the commodity from the meter housing; and an air pressure device configured to generate an air pressure differential across the metering element to retain the commodity on the metering element, the air pressure device being supported on the row unit in a location that is spaced apart from the removable member, the air pressure device configured to remain fixed relative to the row unit support structure during removal of the removable member from another portion of the meter housing.

12. The work vehicle of claim 11, wherein the air pressure device includes a fan housing with an interior and a fan that is housed within the interior of the fan housing, the fan housing being attached to the row unit support structure; and further comprising a fluid connector that extends between the fan housing and the meter housing, the fluid connector defining a passage that fluidly connects the interior of the meter housing and the interior of the fan housing, the fluid connector including a first connector member and a second connector member that are disconnectedly joined at a joint.

13. The work vehicle of claim 12, wherein the first connector member is attached to the removable member;

wherein the second connector member is attached to the fan housing; and wherein the first and second connector members are configured to disconnect at the joint as the removable member is removed from the other portion of the meter housing; and wherein the first and second connector members are configured to connect at the joint as the removable member is attached to the other portion of the meter housing.

14. The work vehicle of claim 13, wherein the joint includes at least one sealing member configured to fluidly seal the joint when the first and second connector members are disconnectedly joined.

15. The work vehicle of claim 14, wherein the joint includes a female joint member included on one of the first and second connector members, the female joint member configured to receive a male joint member of the other of the first and second connector members, the sealing member included on the male joint member.

16. The work vehicle of claim 15, wherein the female joint member includes an annular convex surface, and wherein the sealing member is configured to seal against the annular convex surface.

17. The work vehicle of claim 11, further comprising a collector that is supported by the meter housing, the collector configured to collect a secondary substance that falls due to gravity into the collector structure, thereby avoiding travel to the air pressure device.

18. The work vehicle of claim 17, wherein the collector includes a cleanout valve that is moveable between a closed position and an open position relative to the meter housing;

wherein the collector is configured to collect the secondary substance when the cleanout valve is in the closed position, and wherein the collector is configured to release the secondary substance when the cleanout valve is in the open position; and wherein the air pressure device is configured to generate the air pressure differential that biases the collector toward the closed position.

19. The work vehicle of claim 11, wherein the air pressure device includes an actuator;

further comprising a pressure sensor configured to detect an air pressure condition associated with the air pressure differential generated by the air pressure device; and further comprising a control system configured to control the actuator based, at least partly, on the air pressure condition detected by the pressure sensor.

20. The work vehicle of claim 11, wherein the air pressure device includes an actuator;

further comprising a metering sensor configured to detect a commodity condition associated with the commodity metered out by the metering element; and further comprising a control system configured to control the actuator based, at least partly, on the commodity condition detected by the metering sensor.

* * * * *

UNITED STATES PATENT AND TRADEMARK OFFICE
CERTIFICATE OF CORRECTION

PATENT NO. : 10,709,054 B2
APPLICATION NO. : 15/874171
DATED : July 14, 2020
INVENTOR(S) : Cary S. Hubner et al.

Page 1 of 1

It is certified that error appears in the above-identified patent and that said Letters Patent is hereby corrected as shown below:

In the Claims

In Column 13, Claim 8, Line 37, delete "an actuator:" and insert -- an actuator; --, therefor.

Signed and Sealed this
Fifteenth Day of December, 2020

Andrei Iancu
*Director of the United States Patent and Trademark Office*